United States Patent [19]

Peng

[11] Patent Number: 5,442,725
[45] Date of Patent: Aug. 15, 1995

[54] PIVOTALLY MOUNTED TRAY FOR ORGANIZING OPTICAL FIBERS

[75] Inventor: Peter Peng, Howell, N.J.
[73] Assignee: AT&T Corp., Murray Hill, N.J.
[21] Appl. No.: 114,128
[22] Filed: Aug. 30, 1993
[51] Int. Cl.⁶ .............................................. G02B 6/36
[52] U.S. Cl. ............................................... 385/135
[58] Field of Search .................. 385/134, 135, 136; 211/88; 248/65

[56] References Cited

U.S. PATENT DOCUMENTS

| | | | |
|---|---|---|---|
| 4,805,979 | 2/1989 | Bossard et al. | 385/135 |
| 5,185,845 | 2/1993 | Jones | 385/135 |
| 5,206,927 | 4/1993 | Finzel et al. | 385/135 |
| 5,278,933 | 1/1994 | Hunsinger et al. | 385/135 |

FOREIGN PATENT DOCUMENTS

| | | | |
|---|---|---|---|
| 0288808 | 11/1988 | European Pat. Off. | 385/135 |
| 2573544 | 5/1986 | France | 385/135 |
| 3413401 | 10/1985 | Germany | 385/135 |
| 0249542 | 9/1987 | Germany | 385/135 |
| 4040528 | 1/1991 | Germany | 385/135 |
| 61-295510 | 12/1980 | Japan | 385/135 |
| 3-287210 | 12/1991 | Japan | 385/135 |
| 2151041 | 7/1985 | United Kingdom | 385/135 |
| 2254163 | 9/1992 | United Kingdom | 385/135 |

OTHER PUBLICATIONS

AT&T, AT&T Connector Systems Printed Circuit Board Connector Catalog 1989.
AT&T, Digital Access and Cross-Connect System IV-2000 Reference Manual, Issue 2, pp. 1-1, 5-4, 5-19-,5-20 (Mar. 1990).
Advertisement for Alcatel Network Systems in Telephony, pp. 86, 88 (Mar. 22, 1992).

Primary Examiner—Rodney B. Bovernick
Assistant Examiner—John Ngo

[57] ABSTRACT

A device and method of organizing optical fiber for attachment to a component. Two flanges are mounted on a base plate. The flanges are shaped concave toward each other. The base plate is hinged to the housing of the component. A fiber is slipped through a notch into the space between the flanges and looped under the flanges. The fiber is then attached to the component. The base plate is rotated to be substantially parallel to the face of the component and clasped in the closed position.

14 Claims, 4 Drawing Sheets

PIVOTALLY MOUNTED TRAY FOR ORGANIZING OPTICAL FIBERS

FIELD OF THE INVENTION

The present invention relates to the field of organizing optical fibers.

BACKGROUND OF THE INVENTION

Optical fibers can carry light signals from one point to another. Such fibers are presently being used to carry telecommunication signals from one component of a telecommunication system to another. Optical fibers can carry more signals over higher bandwidths in the same amount of space than traditional electrical wires.

To reduce the space taken up by them, the fibers are bundled together and covered with a sheath to form an optical cable. In general, the cable manufacturer cuts the fibers and attaches an optical connector to the end of each fiber so that all the fibers in a single cable are of the same length. In use, the fibers of a single cable often need to reach different distances. Consequently, the fiber that needs to span the shortest distance often has excess length. Even if the fibers are cut to different lengths, there is often excess fiber length to ensure that all the fibers will reach from one component to the other. It is difficult, however, to cut fibers and mount new optical connectors in the field. Such field terminations take a long time, are expensive to do and, at best, result in connections of inconsistent quality. Consequently, the excess fiber is generally allowed to hang loosely about the components. Since the fiber is stiff, it will often protrude from the component, extending beyond the desired footprint of that component.

This excess fiber length may cause the fiber to snag on a passerby and be broken, or get tangled with the other fibers, as well as extend beyond the desired footprint of the electronic equipment or component. When many fibers are connected to a piece of electronic equipment, it can be difficult to determine which fiber is which. Further, leaving the fibers exposed may result in someone hitting the fibers, bending them beyond their acceptable bending radius, and destroying their ability to carry optical signals clearly.

Optical fibers have a natural stiffness and elasticity which cause them to resist bending and return to a straight condition. Because of this, an optical fiber extends straight out from the component to which it is mounted. However, if the fiber is bent too much (i.e., beyond its bending radius), the signal quality may be compromised. Further, the reliability of the fiber may also be compromised. Consequently, optical fibers can not simply be bent to run along the side of the component, like electrical wires.

It is therefore an object of one aspect of this invention to provide a tray for organizing optical fibers so that they do not extend beyond the footprint of the component.

It is another object of the present invention to provide a tray for organizing optical fibers so that a length of fiber can be selected to reach a desired distance to the component.

It is another object of the present invention to provide a means for storing a length of fiber in a buffer zone so it is less likely to be snagged and pulled inadvertently.

It is another object of the present invention to provide a method of organizing fibers in a buffer zone such that they can be selectively pulled out to extend a desired length.

It is another object of this invention to permit the organization of several fibers, such as separate service and protection cables, and permit them to approach the component from different sides.

These and other objects will be clear to one skilled in the art from the following description of the invention.

SUMMARY OF THE INVENTION

In accord with one aspect of this invention, a tray is provided for organizing optical fibers. An upper flange and a lower flange are mounted on the tray. The flanges extend toward each other, thereby creating a buffer zone. The fiber is organized in a loop under the flanges in the buffer zone.

In accord with another aspect of this invention, a method is provided for organizing optical fibers. The fiber is looped under an upper flange and then looped under a lower flange. The fiber is then attached to an optical coupler on a component. Additional length of fiber may be pulled from under the flanges to reach the optical coupler. The base plate, on which the upper and lower flange are mounted, may be displaced so that it is substantially parallel to the face of the component.

DETAILED DESCRIPTION

Figure 1:
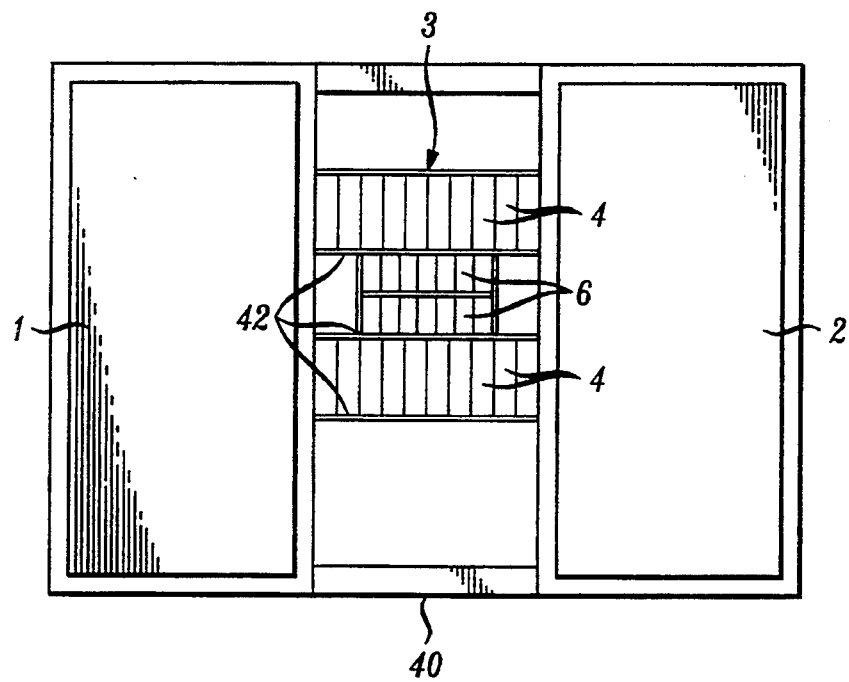
FIG. 1 is a schematic view of a digital access and cross connect system.

FIG. 1 is a schematic view of a typical telecommunication system for which the present invention is planned, such as a digital access and cross connect system, for example, the DACS IV-2000 marketed by AT&T. Of course, the invention can be used for any component or piece of electronics equipment that has fiber, wire or cable leads with excess length.

Telecommunications signals enter the system through interface modules 1, 2. The routing of the signals is directed by a switch module 3. The interface and switch modules are mounted on a bay frame 40. The switch module is composed of various 8-inch circuit packs 4 and 4-inch circuit packs 6 mounted on shelves 42 in the bay frame 40.

As initially installed, the interface modules 1, 2 are operably connected to the switch module 3 by hardwiring, through a backplane of the switch module. The telecommunication signals are electrical signals travelling along wires. In order to increase the capacity of the system, a new switch module 3 must be installed. Rather than physically replace the switch module 3 originally installed, as well as all the hard wiring through the backplane, the signals from the interface modules 1, 2 will be routed to a new switch module or switch complex. The circuit packs 4 will be replaced with new circuits packs 10 (see FIG. 2). The circuit packs 10 receive the electrical signals from the interface modules 1, 2 as did circuit packs 4 and convert those signals into optical signals which are available at optical couplers 11. Optical fibers 20 are then connected to the optical couplers 11 by optical connectors 21 (see FIG. 6). These fibers are then connected to the larger capacity switch complex. As described more fully below, the tray 30 of the present invention permits the replacement of the circuit packs 4 with circuit packs 10 having optical input and output and yet remain within the footprint of the original module 3.

Figure 2:
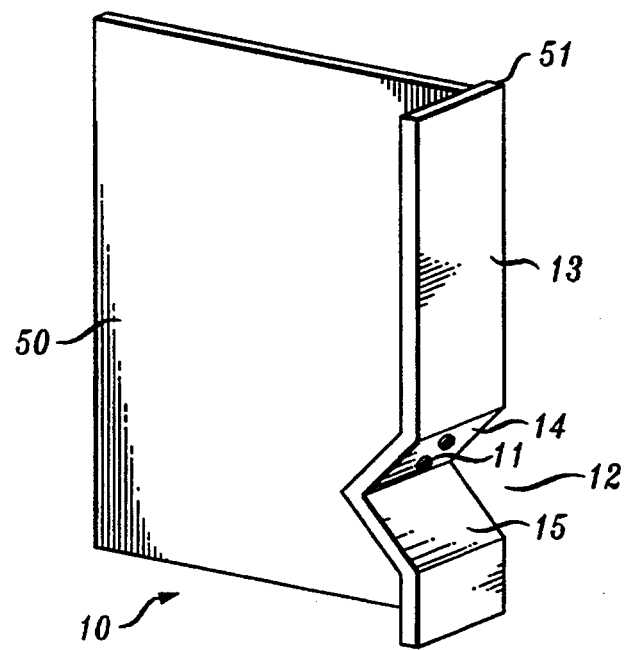
FIG. 2 is a perspective view of a circuit pack shown in isolation.

FIG. 2 is a perspective view of one circuit pack 10 shown in isolation. The circuit pack 10 comprises a circuit board 50 and a front panel 51 mounted perpendicularly to the circuit board. An alcove 12 having an upper face 14 and a lower face 15 is disposed on the front face 13 of the circuit pack 10. Optical couplers 11 are mounted to the upper face 14 and operably engaged to circuit board 50. By mounting the optical couplers 11 at an angle to face 13, the amount of bending of the fibers required to position the fibers in the footprint of the component is reduced (see FIG. 6). By positioning the couplers 11 in the alcove 12, rather than on a protruding ledge as is currently the practice, the overall footprint of the component is further reduced.

Figure 3:
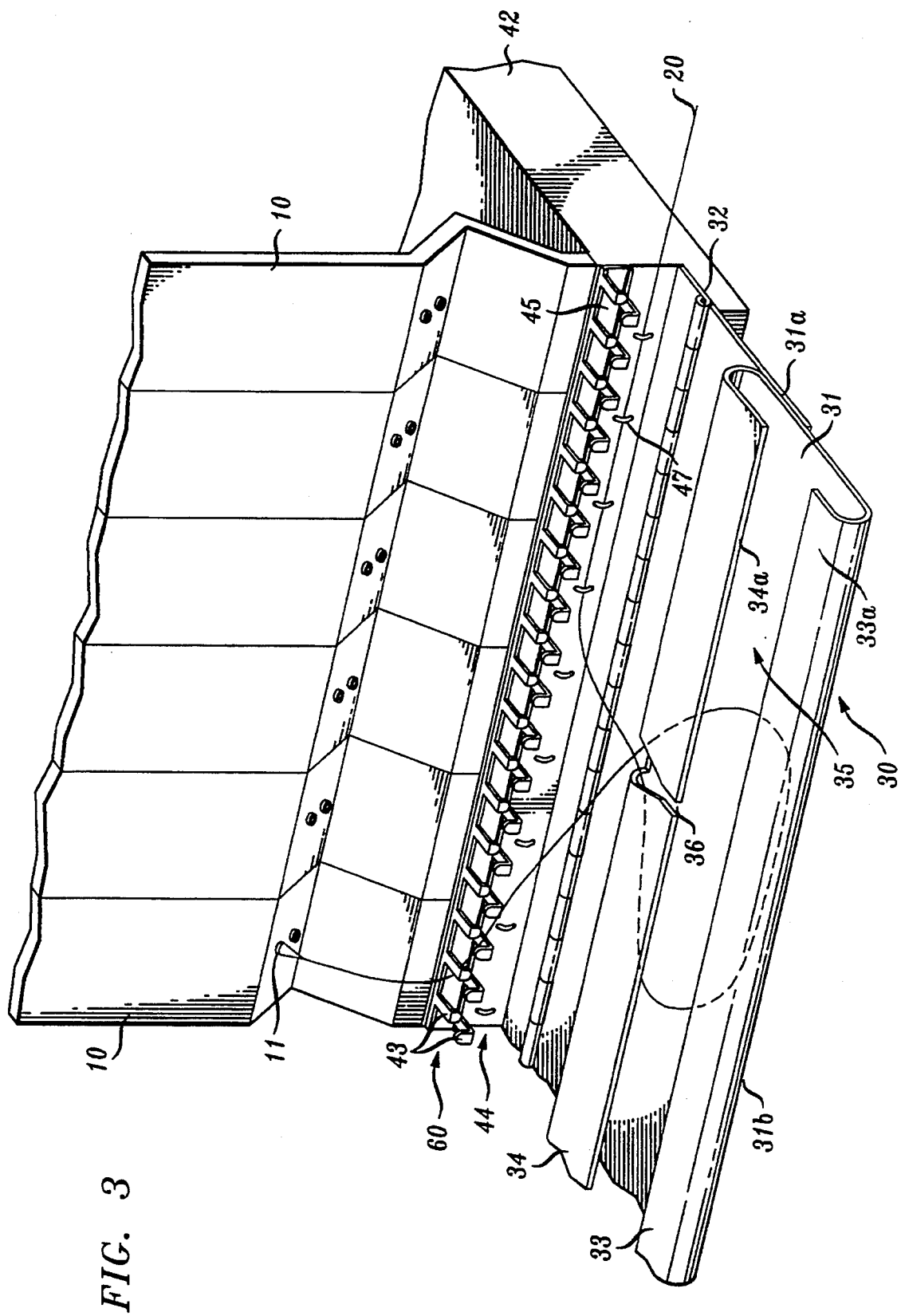
FIG. 3 is a cutaway perspective view of the tray of this invention mounted on a component housing.

FIG. 3 shows a cutaway view of the circuit packs 10 mounted on a shelf 42 of the bay frame 40. The circuit pack 10 is mounted on the shelf 42 and retained in position by a latch 49 (see FIG. 6) in a manner well known in the art. A cage 43 is disposed on the bay frame 40 along the shelf 42. A lower trough 44 is defined as the space between the bottom of the cage 43 and the bay frame 40.

Figure 4:
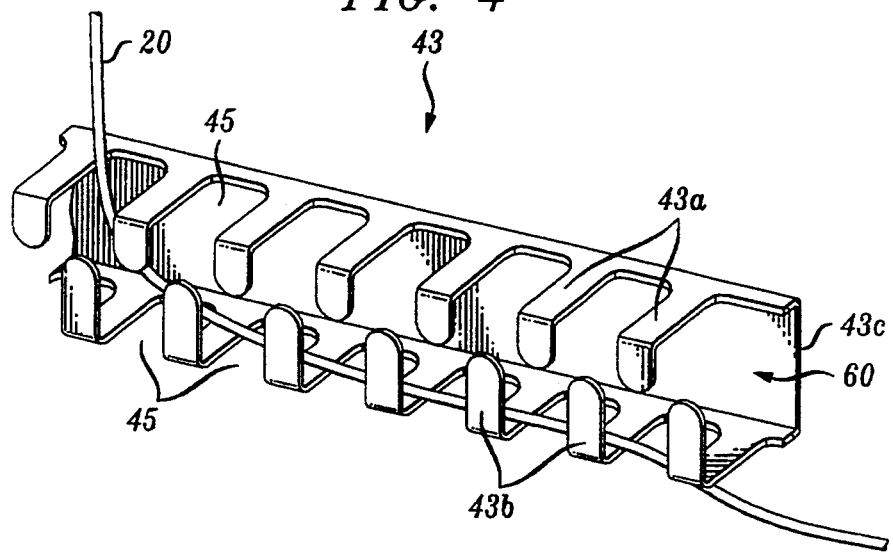
FIG. 4 is a perspective view of a cage shown in isolation.

FIG. 4 shows a perspective view of a portion of the cage 43 shown in isolation. The cage 43 comprises upper fingers 43a, lower fingers 43b, and cage plate 43c. The cage plate 43c is mounted to shelf 42. The space between the fingers 43a, 43b define an upper trough 60. The fingers 43a, 43b are displaced from one another to permit the fiber 20 to be inserted into the upper trough 60. The fingers 43a, 43b are close enough, however, to prevent the fiber 20 from slipping out inadvertently. There is sufficient space between adjacent upper fingers 43a and adjacent lower fingers 43b to create slots 45 between adjacent fingers which are wide enough to permit the fiber 20 to enter and exit the upper trough 60.

Referring again to FIG. 3, the tray 30 comprises a flat plate or base plate 31 which is substantially rectangular. The tray 30 can be made of metal, plastic or any other material suitable to the overall design constraints of the system. A hinge 32 is mounted along a first longitudinal edge or lower edge 31a of the base plate. Preferably, the hinge is a "piano hinge" or any other hinge which ]runs continuously along the entire edge 31a of the base plate 31.

An upper flange or first flange 33 is formed along a second longitudinal edge or upper edge 31b of the base plate. The upper flange 33 may be formed by bending the end of the base plate 31 up and around, thereby forming a substantially u-shaped flange. The upper flange 33 can take various shapes so long as it presents a concave surface toward the lower edge 31a, that is, so long as the tip 33a of the upper flange extends toward the lower edge.

A second flange or lower flange 34 is positioned on the base plate 31 between the first edge 31a and the upper flange 33. The lower flange 34 is also u-shaped such that it presents a concave surface toward the upper flange 33. Similar to the upper flange 33, the lower flange 34 can take various shapes so long as it presents a concave surface toward the upper flange, that is, so long as the tip 34a of the lower flange extends toward the upper flange. The upper flange 33 and lower flange 34 create a buffer zone 35 above the base plate 31 in which the optical fibers are maintained.

Notches or cutouts 36 are positioned along the lower flange 34 to permit the passage of optical fibers 20 into and out of the buffer zone 35. The notch 36 should be wide near the base plate 31 to permit the fibers to go into and out of buffer zone 35 with minimal bending. The notch 36 should be more narrow near the tip of the lower flange 34 to prevent the fibers 20 from inadvertently slipping out. Preferably, the edges of the notches 36 are rounded or smoothed to prevent damaging the fibers 20. The number and position of the notches 36 varies depending on the number of optical fibers 20 and the location of the circuit packs 10 to which the fibers will be connected. As described more fully below, the notches 36 are preferably located as far as possible from the circuit pack 10 so that the fibers 20 are bent as little as possible.

To install the fibers 20 initially, the cable is rigidly attached to the bay frame 40 to prevent any tug on the cable from damaging the optical coupler 11. The fibers are mounted within the lower trough 44 by anchors 47. The fiber 20 is then passed through a notch 36 and into the buffer zone 35. In the buffer zone 35, the fiber 20 is looped under the lower flange 34, under the upper flange 33, back under the lower flange and out the notch 36 into the lower trough 44. The fiber 20 can be looped several times such that there is no slack fiber extending outside the buffer zone. The fiber 20 is then passed through a slot 45 between the lower fingers 43b, run through upper trough 60, and through a slot between upper fingers 43a. An optical connector 21 mounted on the fiber 20 is then attached to the optical coupler 11 on the circuit pack 10. The optical connector is commercially available as an ST connector such as model P3020A-C-125 from AT&T or an SC connector such as model OD-9271 from NEC. The upper slot should be disposed directly beneath the circuit pack 10 to which the fiber 20 is to be attached. In this way, the various circuit packs 10 can be removed and replaced without interference from the fibers connected to the other circuit packs.

Because the fiber 20 is stiff and elastic, tending to become straight, the fiber in the buffer zone 35 pushes against the upper flange 33 and lower flange 34 such that friction keeps the loop in place. When the fiber is pulled, however, it slides over the base plate 31 and through the notch 36. The flanges 33, 34 retain the fibers 20 against the base plate 31 such that the fibers are free to slide over the base plate. The notch 36 and the cage 43 direct the fiber from the buffer zone 35 to the circuit pack 10.

Figure 5:
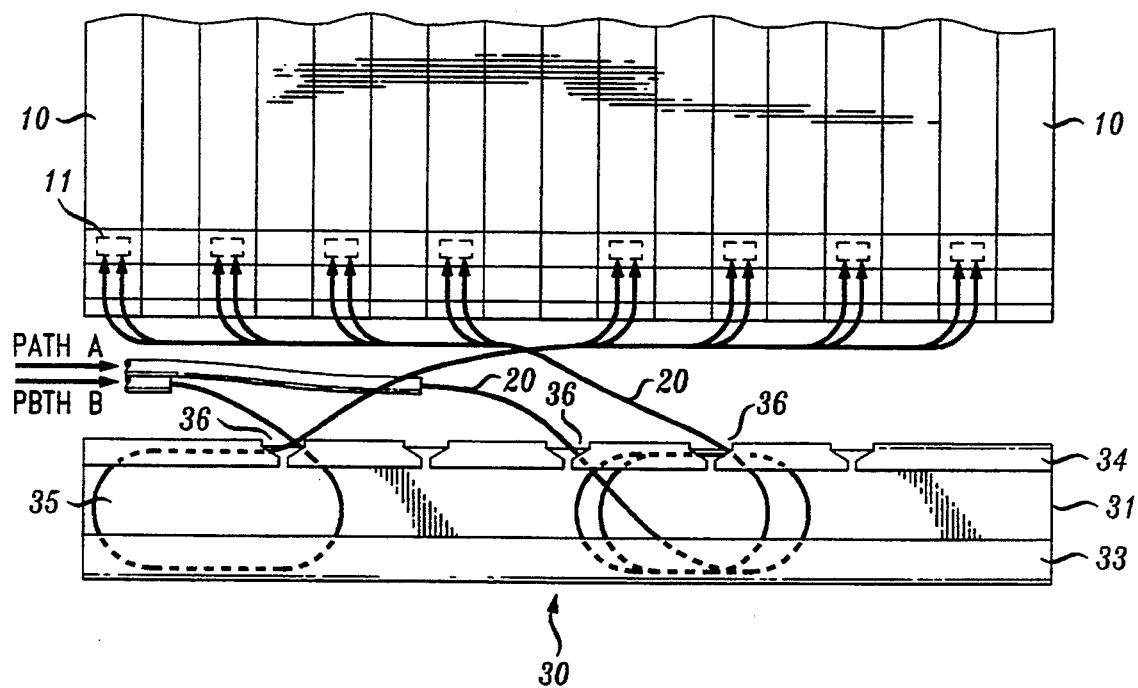
FIG. 5 is a schematic view of various fiber paths used with the tray of FIG. 3.

FIG. 5 is a schematic view of the tray 30 showing two methods for looping the fibers 20 in the tray. The fibers 20 are shown entering the shelf 42 from the left side. The fibers could also be arranged to enter from both sides or the right side. When the fiber 20 is intended to be attached to a circuit pack 10 on the same side that the fiber enters the shelf 42, the fiber follows path A. The fiber 20 enters from the side of the shelf and runs along the lower trough 44. The fiber 20 is slipped through a notch 36 into the buffer zone 35. The fiber is then looped under the upper flange 33, looped under the lower flange 34, back under the upper flange and back out a notch 36. Finally, the optical connector 21 is attached to optical coupler 11 as discussed above. If a longer length of fiber is required to reach the optical coupler 11, the fiber is pulled through the notch 36. Consequently, the size of the loop is reduced in the buffer zone 35, as shown in phantom in FIG. 4.

When the fiber 20 is intended to connect to a circuit pack 10 on the opposite side of the shelf from which the fiber enters, the fiber follows path B. The fiber 20 is slipped through the notch 36 into the buffer zone 35 and looped under lower flange 34. The fiber is then looped under upper flange 33. The fiber is then looped under the lower flange 34 again and through the notch 36 to the circuit pack 10. Finally, the optical connector 21 is attached to optical coupler 11. If a longer length of fiber is required, the fiber is pulled through the notch 36. Consequently, the size of the loop of fiber in the buffer zone 35 is reduced.

As will be appreciated, many different paths can be selected as the particular setup requires. Regardless of the setup, the fiber should preferably be free to be pulled out and pushed into the notch.

Figure 6:
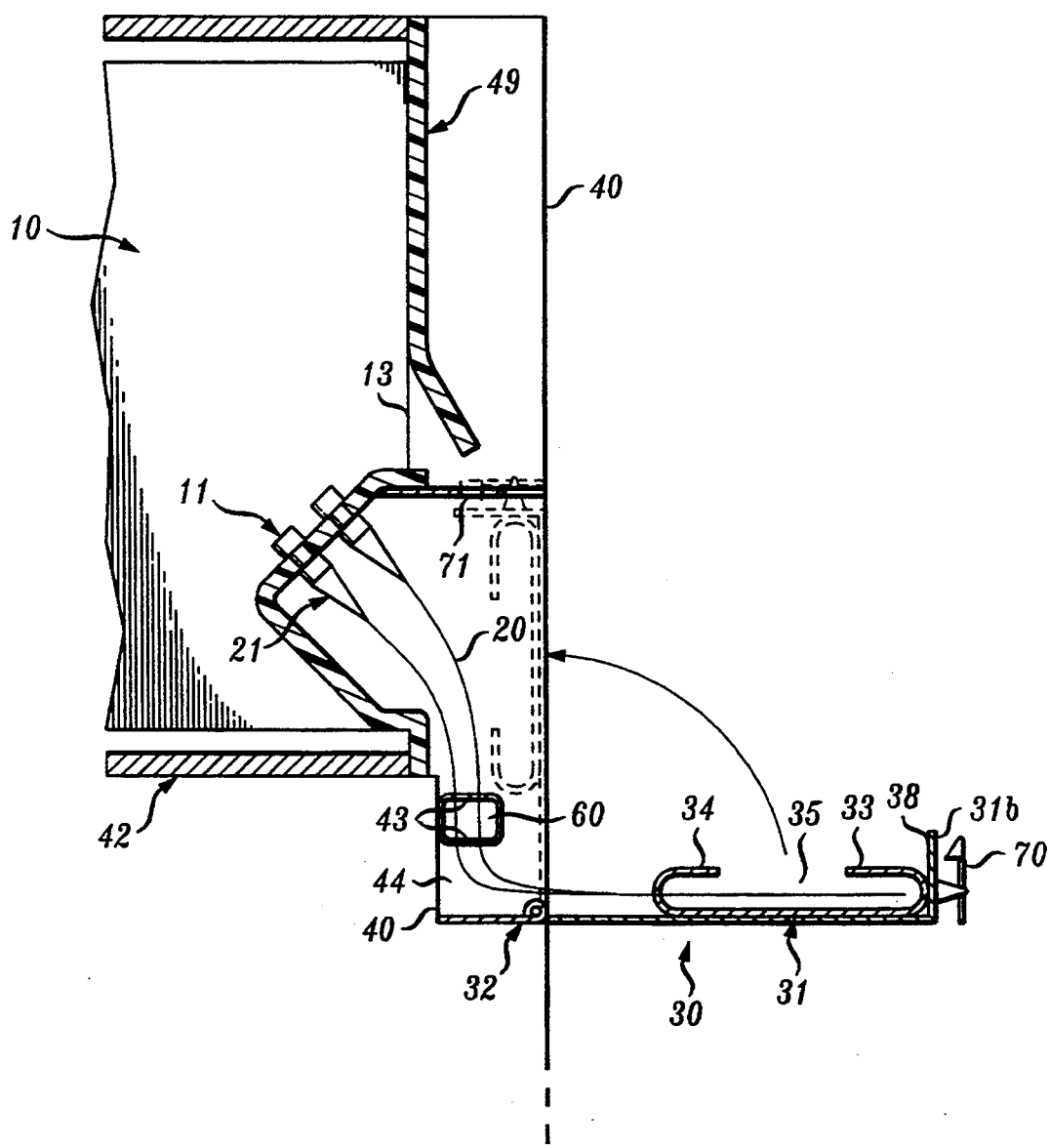
FIG. 6 is a cutaway side view of the tray of the present invention mounted on a component housing.

FIG. 6 is a cutaway side view of a preferred embodiment of the tray 30 of this invention mounted on the bay frame 40 for the circuit pack 10. The upper edge 31b of the base plate 31 is bent at approximately 90° C. to form a platform 38. The upper flange 33 is mounted to the base plate 31 such that the base of the u-shape abuts the platform 38.

As seen in FIG. 6, the base plate 31 can be rotated about the hinge 32 to a closed position (shown in phantom) such that the base plate 31 is substantially parallel to the face 13 of the circuit pack 10. A clasp 70 is mounted on the platform 38 of base plate 31. The clasp 70 engages an aperture 71 on the bay frame 40 to keep the tray 30 in the closed position. The optical fibers 20 which are retained in the buffer zone 35 are thereby held within the predetermined footprint of the switch module. Consequently, existing circuit packs having electrical connections through the backplane can be replaced with circuit packs having optical leads in the front face while the module remains within its desired footprint. Any other clasp capable of holding the tray 30 in the closed position would also be acceptable so long as the clasp does not interfere with the optical fibers. Additional clasps 70 can also be mounted on the base plate 31 to keep the tray 30 closed. Further, the clasps can also be mounted at the side of the base plate 31 as well as on the platform. It is preferred that the clasp be mounted near the upper edge 31b.

As the tray 31 is closed, less fiber length is needed to reach from the optical coupler 11 to the notch 36. Because the fiber loops are not rigidly held in position, the fibers slip back through the notches into the buffer zone as the loops can expand and accept the additional length of fiber. When the organizer tray 30 is rotated to the open position, additional fiber length is required. The length of fiber is pulled from the loop in the buffer zone 35.

As seen in FIG. 6, the upper flange 33 and the lower flange 34 are preferably spaced apart such that they fit within the space between the ledge 43 and the top of the alcove 12. The distance between the hinge 32 and the lower flange 34 is preferably selected so that, in the closed position, the lower flange is above the cage 43. In this way, the tray 31 can be brought closer to the front face 13 of the circuit pack 10, thereby reducing the total space taken up by the tray in the closed position.

The fibers 20 have a minimum bending radius. The buffer zone 35 must be at least as wide as twice the minimum bending radius. For example, a typical minimum bending radius is 1.5 inches. Consequently, the buffer zone must be at least 3 inches wide. A buffer zone of 4 inches has been found appropriate.

Generally, the upper flange 33 will be wider than the lower flange 34 so that, should the fiber 20 sag when the tray 30 is closed, the fiber will still be retained against the base plate 31. With a 4 inch buffer zone 35, a 1.5 inch wide upper flange 33 and a 1 inch wide lower flange 34 have been found appropriate.

The height of the flanges 33, 34 above the base plate 31 is selected to permit the fibers to slide freely over each other without jamming against the base plate. A height of ⅜ inch has been found appropriate.

The tray 30 of the present invention collects and organizes the fibers of varying lengths such that the fibers are prevented from exceeding the permissible bending radius. Further, the tray 30 of the present invention allows the length of the fiber to be effectively altered to reach the optical couplers 11. Additionally, the fibers are contained against the front face of the circuit packs such that the fibers do not extend beyond the predetermined footprint of the component.

It will be understood that changes in the construction of the organizing tray described here may be made without departing from the invention which is defined in the following claims.

I claim:

1. A tray for organizing signal conduits comprising:
   a base plate having a first edge and a second edge;
   a lower flange having a tip mounted on the base plate near the first edge;
   an upper flange having a tip disposed near the second edge;
   a hinge mounted at the first edge of the base plate;
   wherein the tips of the upper flange and the lower flange extend toward each other to create a buffer zone, signal conduits are retained in said buffer zone.

2. The tray of claim 1 wherein notches are disposed along the lower flange to permit passage of signal conduits into and out of the buffer zone.

3. The tray of claim 2 wherein the notches are wider where the lower flange meets the base plate and narrow towards the tip of the flange.

4. The tray of claim 1 further comprising a first clasp mounted on the base plate capable of engaging a bay frame.

5. The tray of claim 4 further comprising a second clasp mounted on the base plate.

6. A module capable of engagement with optical fibers within a desired footprint comprising:
   a bay frame
   at least one circuit pack mounted to the bay frame;
   a hinge mounted to the bay frame;
   a base plate having a lower edge and an upper edge wherein the lower edge is attached to the hinge;
   an upper flange mounted on the base plate near the upper edge shaped to present a concave surface toward the lower edge;
   a lower flange having a tip mounted on the base plate between the lower edge and the upper flange, which lower flange is shaped to present a concave surface toward the upper edge;

wherein the upper flange, lower flange, and base plate define a buffer zone;

wherein at least one notch is disposed in the lower flange to permit the passage of fibers into the buffer zone;

wherein the base plate is rotatable about the hinge to a closed position such that the flanges and the conduit are within the footprint of the module.

7. The tray of claim 6 further comprising at least one clasp mounted on the base plate for engaging the bay frame such that the base plate is retained in the closed position.

8. The tray of claim 6 wherein the notch is broader near the base plate and more narrow near the tip of the lower flange.

9. The tray of claim 6 wherein the circuit pack has an alcove and the buffer zone is sized to fit in the alcove when the plate is in the closed position.

10. A tray for organizing signal conduits comprising:
a base plate having a first edge and a second edge;
a lower flange having a tip mounted on the base plate near the first edge; and
an upper flange having a tip disposed near the second edge;
wherein the tips of the upper flange and the lower flange extend toward each other to create a buffer zone, signal conduits are retained in said buffer zone; and
wherein notches are disposed along the lower flange to permit passage of signal conduits into and out of the buffer zone wherein notches are disposed wider where the lower flange meets the plate and narrow towards the tip of the flange.

11. The tray of claim 10 further comprising a first clasp mounted on the base plate adapted to engage a bay frame.

12. The tray of claim 11 comprising a second clasp mounted to the base plate.

13. The tray of claim 10 wherein the base plate has a rectangular profile.

14. The tray of claim 10 further comprising a platform mounted to the base plate near the second edge.

* * * * *